United States Patent [19]

Watson et al.

[11] Patent Number: 5,529,610
[45] Date of Patent: Jun. 25, 1996

[54] MULTIPLE ZEOLITE ADSORBENT LAYERS IN OXYGEN SEPARATION

[75] Inventors: Charles F. Watson, Orefield; Roger D. Whitley, Allentown; Michael L. Meyer, Fogelsville, all of Pa.

[73] Assignee: Air Products and Chemicals, Inc., Allentown, Pa.

[21] Appl. No.: 373,836

[22] Filed: Jan. 17, 1995

Related U.S. Application Data

[63] Continuation-in-part of Ser. No. 116,933, Sep. 7, 1993, abandoned.

[51] Int. Cl.$^6$ .................................................. B01D 53/047
[52] U.S. Cl. ........................ 95/100; 95/101; 95/105; 95/122; 95/130; 95/139; 96/130; 96/132; 96/133; 96/144; 96/154
[58] Field of Search ............... 95/97, 98, 100–105, 95/117–119, 122, 130, 148; 96/121, 132–134, 136, 143, 144, 154

[56] References Cited

U.S. PATENT DOCUMENTS

| | | | |
|---|---|---|---|
| 1,963,874 | 6/1934 | Stampe | 96/132 |
| 3,221,476 | 12/1965 | Meyer | 95/97 |
| 3,237,377 | 3/1966 | Skarstrom | 95/97 |
| 3,636,679 | 1/1972 | Batta | 55/26 |
| 4,013,429 | 3/1977 | Sircar et al. | 95/101 |
| 4,026,680 | 5/1977 | Collins | 55/26 |
| 4,519,813 | 5/1985 | Hagiwara et al. | 95/101 |
| 4,557,736 | 12/1985 | Sircar et al. | 95/97 |
| 4,711,645 | 12/1987 | Kumar | 95/98 |
| 4,756,723 | 7/1988 | Sircar | 55/25 |
| 4,859,217 | 8/1989 | Chao | 95/130 |
| 4,892,565 | 1/1990 | Schmidt et al. | 55/26 |
| 4,950,311 | 8/1990 | White, Jr. | 95/98 |
| 4,950,312 | 8/1990 | Puppe et al. | 95/130 |
| 5,114,440 | 5/1992 | Reiss et al. | 55/25 |
| 5,152,813 | 10/1992 | Coe et al. | 55/26 |
| 5,169,413 | 12/1992 | Leavitt | 95/130 X |
| 5,258,060 | 11/1993 | Gaffney et al. | 95/101 |
| 5,266,102 | 11/1993 | Gaffney et al. | 95/103 |
| 5,268,023 | 12/1993 | Kirner | 95/103 |
| 5,354,360 | 10/1994 | Coe et al. | 95/130 X |

FOREIGN PATENT DOCUMENTS

| | | | |
|---|---|---|---|
| 0512781 | 11/1992 | European Pat. Off. . | |
| 4-293513 | 10/1992 | Japan . | |
| 1380764 | 3/1988 | U.S.S.R. | 95/105 |
| 1430075 | 10/1988 | U.S.S.R. | 95/102 |

*Primary Examiner*—Robert Spitzer
*Attorney, Agent, or Firm*—Geoffrey L. Chase

[57] ABSTRACT

The present invention is an apparatus and process for separating oxygen from air by adsorption of at least nitrogen on multiple layers of air separation adsorbent in an adsorption bed wherein the multiple layers are Na X-zeolite followed by at least another layer of adsorbent selected from the group consisting of Ca X-zeolite, Li X-zeolite, Ca A-zeolite followed by Ca X-zeolite, Ca A-zeolite followed by Li X-zeolite, Ca X-zeolite followed by Li X-zeolite, Li X-zeolite followed by Ca X-zeolite and Mg A-zeolite followed by Ca X-zeolite.

15 Claims, 1 Drawing Sheet

MULTIPLE ZEOLITE ADSORBENT LAYERS IN OXYGEN SEPARATION

The present application is a Continuation-in-part application of U.S. patent application Ser. No. 08/116,933 filed Sep. 7, 1993.

FIELD OF THE INVENTION

The present invention is directed-to the field of oxygen recovery from air using pressure swing or vacuum swing adsorption in an adsorption bed containing multiple layers of main air separation adsorbents.

BACKGROUND OF THE PRIOR ART

Oxygen is a commodity chemical in the industrial gas industry. It has numerous applications, including wastewater treatment, glass melting furnace, and steel industry. One of the most common methods of oxygen production is by cryogenic distillation of air. However, this technology is not competitive for small size oxygen plants (<100 TPD $O_2$). The technology of choice for this size range is adsorptive separation. There is a need in the marketplace to produce oxygen at low capital and energy costs by adsorptive gas separation.

Adsorptive processes are extensively used in the industry to produce oxygen from air for small size oxygen plants (<100 TPD $O_2$). There are two major categories of these processes; pressure swing adsorption processes and vacuum swing adsorption processes. The pressure swing adsorption (PSA) processes carry out the adsorption (feed) step at pressures much higher than ambient pressure and adsorbent regeneration at pressures close to ambient pressure. The adsorbent beds go through secondary process steps such as pressure equalizations, repressurizations, blowdowns, and purge or various combinations of these during the cycle.

PSA processes tend to be energy intensive and more suitable for smaller oxygen plants producing less than 40 tons of oxygen per day and preferably less than 20 tons of oxygen per day. Primary reasons for high energy consumption in PSA processes are: (1) $O_2$ recovery from these processes is low, and (2) the entire feed stream has to be compressed up to the adsorption pressure. These inefficiencies are somewhat circumvented in vacuum swing adsorption (VSA) processes. In these processes, adsorption is carried out at pressure close to ambient pressure, and adsorbent regeneration is carried out at sub-atmospheric pressure levels. The adsorbent beds go through several secondary steps, such as; pressure equalizations, repressurizations, and purge, or various combinations of these during the course of the cycle with the primary aim of increasing oxygen recovery and reducing adsorbent inventory per unit of product gas.

In both PSA and VSA processes a typical adsorber configuration consists of an adsorption bed having an inlet for admitting air and an outlet for removing oxygen rich product. Per U.S. Pat. No. 4,892,565, the bed normally contains two adsorbent layers. The first layer comprising approximately 15% of the adsorber volume and being located adjacent to the inlet end of the adsorber is specific to the selective removal of water and carbon dioxide. The second layer comprising approximately 85% of the adsorber volume and being located adjacent to the outlet end of the adsorber is specific to the selective removal of nitrogen. As a reflection of its functionality, the first layer is commonly called the pretreatment layer. The second layer is similarly called the main adsorbent layer, comprising, in the present invention, air separation adsorbent which separates nitrogen from oxygen in the feed air. Typical pretreatment adsorbents include alumina, NaX zeolite and silica gel. Typical main bed adsorbents include NaX, CaX, CaA, MgA, and LiX zeolites. U.S. Pat. No. 5,114,440 teaches that the typical pretreatment layer comprises approximately 15% of the adsorber volume while the main adsorbent layer comprises approximately 85%. The pretreatment material is usually selected on the basis of its working capacity for water and $CO_2$ under the specific VSA/PSA cycle conditions. The main adsorbent material is usually selected on the basis of its cost and its working selectivity and capacity for nitrogen over oxygen under the specific VSA/PSA cycle conditions. The VSA/PSA cycle conditions which affect this decision normally include feed gas temperature, adsorption pressure and desorption/evacuation pressure. Lower capacity adsorbents, such as NaX, are generally favored at low feed temperature and high adsorption pressure conditions, while CaX, CaA, MgA, LiX are generally favored at high feed temperature and low adsorption pressure conditions. Selection of the ideal adsorbent is normally based upon tests done in laboratory size adsorbers, 2" to 4" in diameter. Frequently however, there is a significant performance loss (lower $O_2$ recovery and production) in the full-scale plant, relative to the lab scale. The primary cause of the performance loss is an axial temperature profile that develops in the main adsorbent layer during full scale plant operation. It is not uncommon for there to be a 100° F. difference between the lower (inlet) cold end and the upper (outlet) hot end of the main adsorbent layer.

This temperature profile is detrimental because commercially available zeolites do not function optimally over such a wide range of temperatures. High capacity zeolites such as Ca X-zeolite lose selectivity and develop a high capacity for $O_2$ at low temperatures (below 50° F.). This $O_2$ is subsequently rejected to waste on the evacuation step, thereby lowering product $O_2$ recovery. Such zeolites are also difficult to regenerate with vacuum when they are cold. Specific vacuum power increases as a result. Lower capacity zeolites, such as NaX, do not adsorb enough $O_2$ in the cold part of the bed to suffer from low recovery. However, they consequently suffer from low capacity and selectivity in the hot section of the bed (above 50° F.).

These losses in performance were originally documented by Collins in U.S. Pat. No. 4,026,680. Several efforts have been made to overcome them by varying the capacity of adsorbents in a bed per European Application No. 0 512 781. Differing capacities of Ca A-zeolite are suggested in U.S. Pat. No. 5,114,440. An obvious solution is to raise the feed temperature. This does raise the minimum temperature by effectively shifting the entire profile upwards. The resulting high temperatures at the product end of the bed causes a loss of adsorbent capacity, thereby partially or completely counteracting the benefit of the increased minimum temperature. Another proposed solution is to employ conducting rods or plates, axially aligned in the bed to moderate the temperature profile by heat conduction per U.S. Pat. No. 4,026,680. This solution is difficult and expensive to install in full-sized adsorber beds. The operating pressure envelope can be reduced, but at a cost to sieve productivity. Japanese Patent Appln. No. 4-293513 discloses a process using adsorption beds layered with only Ca A-zeolite followed by Ca X-zeolite to improve process performance based upon better management of heats of adsorption.

Additional patents of interest include; U.S. Pat. No. 3,636,679; U.S. Pat. No. 4,756,723; U.S. Pat. No. 4,892,565 and U.S. Pat. No. 5,152,813.

Despite the prior art, a need still exists for process technology which will eliminate the detrimental effects of full-scale adiabatic temperature profiles in $O_2$ PSA/VSA processes at minimal cost and such that the performance loss between laboratory size adsorbers and full scale adsorbers is eliminated. This is the object of the present invention.

BRIEF SUMMARY OF THE INVENTION

The present invention is an apparatus for separating oxygen from air by adsorption of nitrogen in air, comprising; a multilayered adsorption bed having an inlet for admitting air and an outlet for removing an oxygen-rich gas, a pretreatment adsorbent layer adjacent the inlet used to remove impurities in the air including water and carbon dioxide, followed by multiple layers of air separation adsorbent in the bed comprising a layer of Na X-zeolite air separation adsorbent near the inlet comprising between approximately 20% and 70% of the total adsorbent of the adsorption bed and at least another layer of air separation adsorbent near the outlet selected from the group consisting of Ca X-zeolite, Li X-zeolite, Ca A-zeolite followed by Ca X-zeolite, Ca A-zeolite followed by Li X-zeolite, Ca X-zeolite followed by Li X-zeolite, Li X-zeolite followed by Ca X-zeolite and Mg X-zeolite followed by Ca X-zeolite.

Preferably, the multilayered adsorption bed is employed in a PSA process to recover oxygen-rich gas as an unadsorbed product with the layer of Na X-zeolite air separation adsorbent comprising between 50 and 70% of the total adsorbent of the multilayered adsorption bed, with the remainder of the air separation adsorbent being Ca X-zeolite.

Alternatively, the multilayered adsorption bed is employed in a VSA process to recover oxygen-rich gas as an unadsorbed product with the layer of Na X-zeolite air separation adsorbent comprising between 20 and 50% of the total adsorbent of the multilayered adsorption bed, with the remainder of the air separation adsorbent being Ca X-zeolite.

Preferably, the pretreatment layer comprises up to 17% of the total adsorbent.

Preferably, the Li X-zeolite is Li,Ca LSX zeolite. More preferably, the Li X-zeolite is Li,Zn LSX zeolite.

Preferably, the Mg A-zeolite is Mg,Li A-zeolite.

The present invention is also a process for separating oxygen from air by adsorption of nitrogen in air, comprising: (a) passing air into a multilayered adsorption bed having an inlet for admitting air and an outlet for removing an oxygen-rich gas, a pretreatment adsorbent layer adjacent the inlet used to remove impurities in the air including water and carbon dioxide, followed by multiple layers of air separation adsorbent in the bed comprising a layer of Na X-zeolite near the inlet comprising between approximately 20% and 70% of the total adsorbent of the adsorption bed and at least another layer of air separation adsorbent near the outlet selected from the group consisting of Ca X-zeolite, Li X-zeolite, Ca A-zeolite followed by Ca X-zeolite, Ca A-zeolite followed by Li X-zeolite, Ca X-zeolite followed by Li X-zeolite, Li X-zeolite followed by Ca X-zeolite and Mg A-zeolite followed by Ca X-zeolite; (b) adsorbing at least nitrogen on the multiple layers; and (c) recovering oxygen as a relatively unadsorbed product from the outlet of the bed.

Preferably, the bed is operated cyclically through the series of steps in PSA process comprising: (a) passing air into said inlet of the bed to adsorb at least nitrogen and to recover oxygen as an unadsorbed product at the outlet; (b) terminating passage of air into the bed and depressurizing the bed to provide pressurizing gas to a parallel bed; (c) depressurizing the bed to vent, countercurrently to the passage of air; (d) purging the depressurizing bed with oxygen product; (e) repressurizing the purging bed with pressurizing gas from another parallel bed undergoing depressurization; and (f) further repressurizing the repressurizing bed with air. More preferably, this process would use two beds connected in parallel.

Alternatively, the bed is operated cyclically through the series of steps in a VSA process comprising: (a) passing air into the inlet of the bed to adsorb at least nitrogen and to recover oxygen as an unadsorbed product at the outlet; (b) terminating passage of air into the bed and depressurizing the bed to provide purge gas to a parallel bed; (c) further depressurizing the bed to provide pressurizing gas to a parallel bed; (d) evacuating the depressurizing bed countercurrently to the passage of air to a subatmospheric pressure level; (e) purging the evacuating bed with purge gas from a parallel bed; (f) repressurizing the purging bed with pressurizing gas from a parallel bed; and (g) further repressurizing the purging bed with oxygen product. Preferably, at the initial portion of step (b) said bed is cocurrently depressurized to recover additional oxygen before providing said pressurizing gas. More preferably, the repressurizing of step (g) is performed with said oxygen product and air. More preferably, this process is conducted in three beds connected in parallel.

Alternatively, the bed is operated cyclically through the series of steps in a VSA process comprising: (a) passing air into the inlet of the bed to adsorb at least nitrogen and to recover oxygen as an unadsorbed product at the outlet; (b) terminating passage of air into the bed and depressurizing the bed to provide pressurizing gas to a parallel bed; (c) evacuating the depressurizing bed countercurrently to the passage of air to a subatmospheric pressure level; (d) purging the evacuating bed with product from a parallel bed; (e) repressurizing the purging bed with air and pressurizing gas from a parallel bed; and (f) further repressurizing the purging bed with air. More preferably the process is conducted in two beds connected in parallel.

Figure 2:
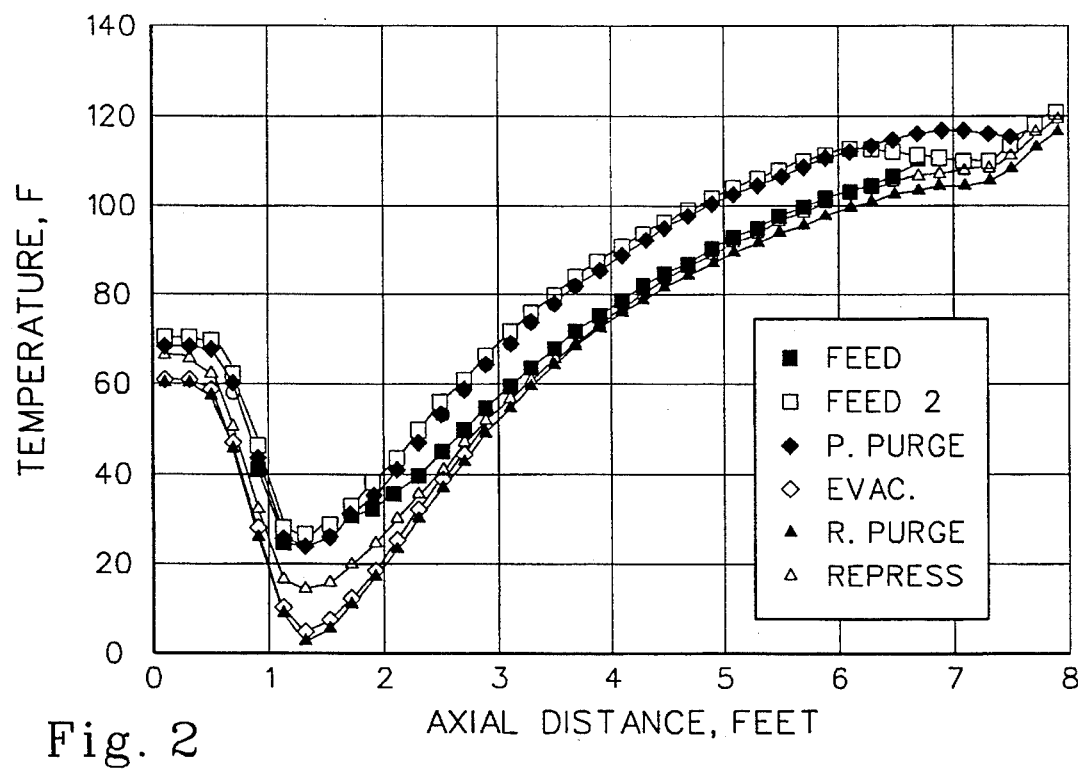
FIG. 2 illustrates a typical axial temperature profile in a full scale PSA/VSA adsorber.

DETAILED DESCRIPTION OF THE INVENTION $O_2$ PSA and VSA processes are typically designed in small laboratory size adsorbers, 2" to 4" in diameter. Performance results are then scaled up to full size plant designs which typically employ adsorber diameters of 3' to 12'. A typical $O_2$ VSA/PSA adsorption bed consists of a pretreatment layer, usually a small fraction of the overall bed length followed by the main or air separation adsorption layer. Frequently, there is a significant performance loss (lower $O_2$ recovery and production) in the full-scale plant, relative to the lab scale. Table 1 illustrates typical performance losses for $O_2$ PSA and VSA processes. The primary cause of the performance loss is an axial temperature profile that develops in the main or air separation adsorption layer during large scale adiabatic operation, as depicted in FIG. 2.

TABLE 1

LAB PERFORMANCE VS. FULL SCALE PERFORMANCE

| $O_2$ PSA Process | Lab Scale | Full Scale |
|---|---|---|
| Main Sieve | NaX | NaX |
| $O_2$ Recovery | 40% | 27% |
| Sieve Productivity (TPD $O_2$/TON Sieve) | 0.88 | 0.64 |

| $O_2$ VSA Process | Lab Scale | Full Scale |
|---|---|---|
| Main Sieve | CaA | CaA |
| $O_2$ Recovery | 55% | 45% |
| Sieve Productivity (TPD $O_2$/ TON Sieve) | 1.0 | 0.8 |

This profile arises in the following manner: on the adsorptive step, heat is released (heat of adsorption) and is carried toward the product end of the bed as the adsorption step progresses at elevated pressure. On the regeneration step, there is cooling (heat of desorption) towards the feed end as the bed is desorbed by depressurization. Consequently, a profile develops such that the difference in temperature between the beginning of the main or air separation adsorbent (cold end) and the product end (hot) can be as much as 100° F. or more. The problem is exacerbated by high working capacities and high heats of adsorption for $N_2$ or $O_2$. This phenomenon is not observed in lab-scale $O_2$ VSA/PSA. Because of the small diameter of these adsorbers, significant heat exchange with the surrounding environment occurs and operation is not adiabatic.

This temperature profile is detrimental because commercially available zeolites do not function optimally over such a wide range of temperatures. High capacity zeolites, such as Ca X-zeolite, lose selectivity and develop a high capacity for $O_2$ at low temperatures (below 50° F.). This $O_2$ is subsequently rejected to waste on the evacuation step, thereby lowering product $O_2$ recovery. Such zeolites are also difficult to regenerate with vacuum when they are cold. Specific vacuum power increases as a result. Lower capacity zeolites, such as NaX, do not adsorb enough $O_2$ in the cold part of the bed to suffer from low recovery. However, they consequently suffer from low capacity and selectivity in the hot section of the bed (above 50° F.).

The proposed invention is a multi-layered main adsorbent layer employing two or more main or air separation adsorbent layers. Such air separation adsorbent layers predominantly participate in the selective separation of air by adsorption of nitrogen preferentially over oxygen and are distinct from any pretreatment layer, such as alumina, NaX or silica gel which may be used to remove by adsorption impurities in the feed air, such as water and carbon dioxide. It has been found that by utilizing a layer of low capacity, high selectivity zeolite in the cold, bottom (inlet) section of the main (air separation) adsorbent bed (to minimize $O_2$ loading there) and a layer of high capacity zeolite in the hot, upper (outlet) section of the main (air separation) bed (to retain working capacity) that:

1) recovery and production are higher than that which can be obtained with either zeolite by itself;

2) the extent and severity of the temperature profile is reduced; and 3) the load on the vacuum train in $O_2$ VSA processes is decreased, thereby increasing the productivity and decreasing the specific power requirement of the vacuum train.

Figure 1:
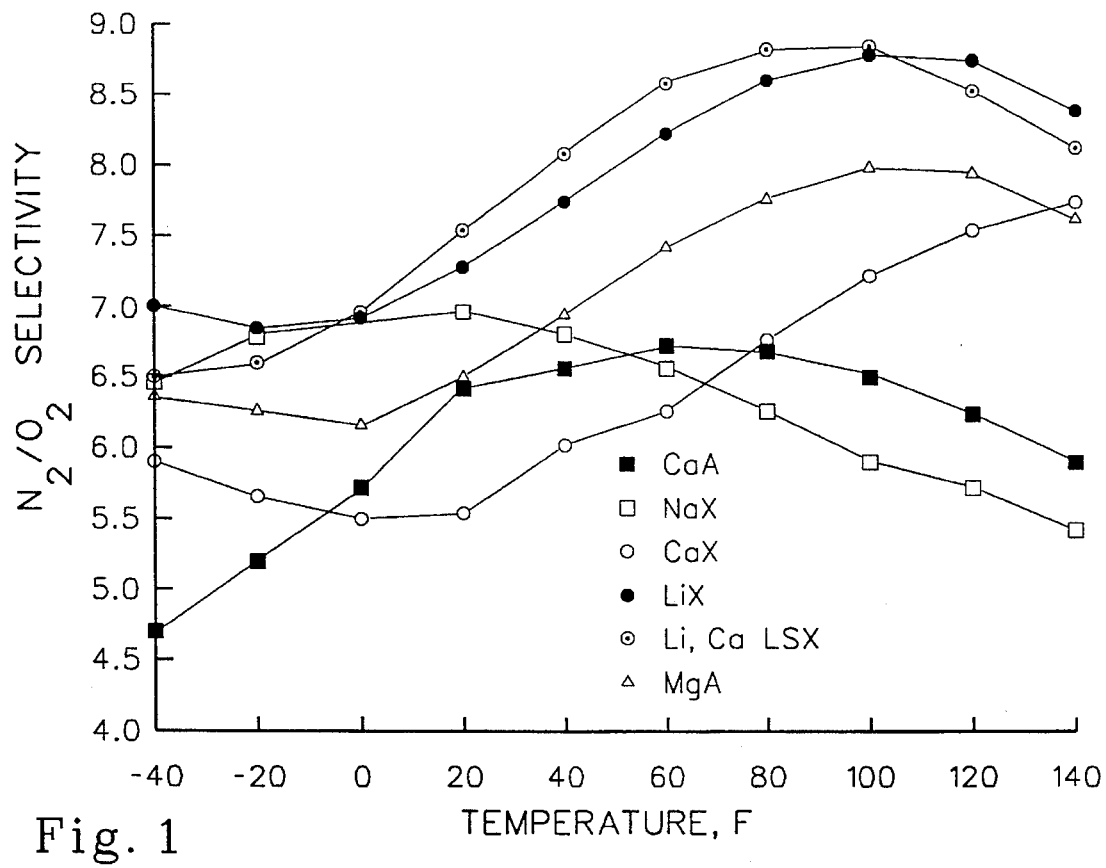
FIG. 1 is a graph of selectivity versus temperature for several of the adsorbents of the present invention.

The adsorbent for the bottom layer of the air separation adsorbent bed near the inlet or pretreatment adsorbent layer has been found to be low binder Na X-zeolite. This material has low $O_2$ capacity, low heat of $N_2/O_2$ adsorption relative to other zeolites, and its maximum $N_2/O_2$ selectivity occurs at the temperatures typically observed in the bottom layer of the air separation adsorbent in an $O_2$ PSA/VSA process (−40+ to +50° F.) per the FIG. 1 drawing. It is also a low cost material. Preferably, the Na X-zeolite air separation adsorbent layer comprises approximately 20 to 70% of the total adsorbent in the multilayered adsorption bed. In a pressure swing adsorption process (PSA), the Na X-zeolite air separation adsorbent layer is preferably approximately 50 to 70% of the total adsorbent in the adsorption bed. In a vacuum swing adsorption process (VSA), the Na X-zeolite air separation adsorbent layer is preferably approximately 20 to 50% of the total adsorbent in the adsorption bed. The pretreatment adsorbent is preferably up to 17% of the total adsorbent in the multilayered adsorption bed. In a PSA process, the pretreatment adsorbent is preferably alumina, while in a VSA process, the pretreatment adsorbent is preferably Na X-zeolite. The total adsorbent means all of the air separation adsorbent and any pretreatment adsorbent in the multilayered adsorption bed.

The preferred adsorbent for the upper layer of the air separation adsorbent near the outlet of the bed is a high capacity, high selectivity zeolite, such as Ca X-zeolite, Li X-zeolite, Ca A-zeolite followed by Ca X-zeolite, Ca A-zeolite followed by Li X-zeolite, Ca X-zeolite followed by Li X-zeolite, Li X-zeolite followed by Ca X-zeolite or Mg A-zeolite followed by Ca X-zeolite. The Li X-zeolite includes Li,Na X-zeolites and more preferably Li,Ca LSX-zeolite and Li,Zn LSX-zeolite. The designation LSX refers to low silica X-zeolites having a silicon to aluminum ratio of approximately 1. Similarly, the Mg A-zeolite includes Mg,Li A-zeolite. These materials exhibit maximum working selectivities at the temperatures typically observed in the upper layer of the main adsorbent bed (+50+ to 140° F.) per the FIG. 1 drawing. Particularly, a multiple layered air separation adsorbent of Na X-zeolite, Ca A-zeolite and Ca X-zeolite in a series from the inlet of a bed (or adjacent the pretreatment adsorbent layer) to the outlet of a bed takes advantage of the optimum selectivities of each adsorbent at the expected temperature at its relative location in the bed.

It is not necessary for the air separation adsorbent materials to be chemically similar; i.e., all Ca A-zeolite as claimed in U.S. Pat. No. 5,114,440. Maximizing working $N_2/O_2$ selectivity in all parts of the bed and minimizing $O_2$ loading in the bottom half (inlet end) of the main bed are the critical elements of the invention. The Na X-zeolite material is capable of providing $N_2/O_2$ selectivity >6.0 and low $O_2$ capacity at temperatures of −40° to +50° F. as the bottom layer of the main or air separation adsorbent layer of the bed near the inlet of the bed or the pretreatment layer, as the case may be. Low heat of adsorption is another desirable characteristic of the bottom layer zeolite; this makes the bed easier to regenerate with vacuum, thereby increasing the productivity and decreasing the specific power requirement of $O_2$ VSA processes. It also reduces the severity of the resulting adiabatic temperature profile. The Ca X-zeolite, Li X-zeolite and combinations recited above are capable of providing $N_2/O_2$ selectivity >6.0 and high $N_2$ capacity at temperatures of 50° to 140° F. as the upper layer(s) of the main or air separation adsorbent layer of the bed. The invention is not limited to two main or air separation adsorbent bed layers. Three or more layers are possible.

EXAMPLE 1

A 10 TPD $O_2$ PSA plant employing the cycle described in Table 2 was initially constructed using 8 feet of Na X-zeolite main sieve on top of or downstream of 18 inches of alumina pretreatment adsorbent. $O_2$ production was 8 TPD at the optimal feed temperature of 95° F. Replacement of the top 2 feet of Na X-zeolite with Ca X-zeolite increased production to 12 TPD. The performance comparison is set forth in Table 3. The cycle comprises the steps of: (a) passing air into the inlet of the bed to adsorb at least nitrogen and to recover oxygen as an unadsorbed product at the outlet; (b) terminating passage of air into the bed and depressurizing the bed to provide pressurizing gas to a parallel bed; (c) depressurizing the bed to vent, countercurrently to the passage of air; (d) purging the depressurizing bed with oxygen product; (e) repressurizing the purging bed with pressurizing gas from another parallel bed undergoing depressurization; and (f) further repressurizing the repressurizing bed with air. These steps are performed in a set of parallel beds operated in a continuous cycle out of phase with one another as set forth in Table 2.

TABLE 2

Oxygen PSA Cycle-2 Bed

| Feed Repressurize | Feed + Product | Provide PE | Depressurization | Product Purge | Receive PE |
|---|---|---|---|---|---|
| Depressurization | Product Purge | Receive PE | Feed Repressurize | Feed + Product | Provide PE |

TABLE 3

PERFORMANCE COMPARISON-PSA CYCLE

| Case | 1 | 2 |
|---|---|---|
| Data Source | Actual Plant | Actual Plant |
| $Al_2O_3$ Pretreat Volume, % of total | 15% | 15% |
| NaX Main Sieve Volume, % of total | 85% | 63% |
| CaX Main Sieve Volume, % of total | — | 22% |
| Bed Diameter, ft. | 6.5 | 6.5 |
| Product Purity, % $O_2$ | 88 | 88 |
| Cycle Time, sec. | 120 | 120 |
| Feed Pressure, psig | 40 | 40 |
| Feed Temperature, °F. | 95 | 120 |
| $O_2$ Production, $TPD_c$ | 8.0 | 12.0 |
| $O_2$ Recovery, % $O_2$ | 28 | 32 |
| Minimum Bed Temperature, °F. | 15 | 25 |
| Maximum Bed Temperature, °F. | 85 | 110 |
| Sieve Productivity TPD $O_2$/ton sieve | 0.64 | 0.96 |

These results show an increase in oxygen production from 8 tons/day (TPD) to 12 TPD using the present invention, an increase in oxygen recovery from 28% to 32% using the present invention and an increase in adsorbent (sieve) productivity from 0.64 TPD/ton sieve to 0.96 TPD/ton sieve using the present invention.

In the examples of the present invention, the different main or air separation adsorbent bed layers were physically separated from each other by a screen. Performance of the invention could be enhanced by allowing limited mixing at the adsorbent layer interface since a smoother transition in $O_2$ capacity could be accomplished. This limited mixing could be achieved by eliminating the separating screens and employing zeolites of similar particle size and density.

EXAMPLE 2

An $O_2$ VSA process is also amenable to the layered adsorbents of the present invention. Such a cycle is depicted in Table 4 below. The cycle is operated cyclically through the series of steps comprising: (a) passing air into the inlet of said bed to adsorb at least nitrogen and to recover oxygen as an unadsorbed product at the outlet; (b) terminating passage of air into the bed and depressurizing the bed to provide purge gas to a parallel bed; (c) further depressurizing the bed to provide pressurizing gas to a parallel bed; (d) evacuating the depressurizing bed countercurrently to the passage of air; (e) purging the evacuating bed with purge gas from a parallel bed; (f) repressurizing the purging bed with pressurizing gas from a parallel bed; and (g) further repressurizing the purging bed with oxygen product. These steps are performed in a set of parallel beds operated in a continuous cycle out of phase with one another as set forth in Table 4.

TABLE 4

OXYGEN VSA CYCLE-3 BED

| Feed + Product | | | Provide Purge | PE | Evacuation | Vacuum Purge | PE | Product Repressurize |
|---|---|---|---|---|---|---|---|---|
| Vacuum Purge | PE | Product Repressurize | Feed + Product | | | Provide Purge | PE | Evacuation |
| Provide Purge | PE | Evacuation | Vacuum Purge | PE | Product Repressurize | Feed + Product | | |

An oxygen VSA cycle was simulated using the cycle of Table 4 at two feed gas temperatures, 70° F. and 90° F. A comparison was made of: (1) a pretreatment layer of Na X-zeolite to remove water and carbon dioxide, followed by Ca X-zeolite as the main or air separation adsorbent selection for the adsorption of $N_2$ preferentially to $O_2$ in air, per U.S. Pat. No. 4,892,565 (1(A)@70° F., 1(B)#90° F.); and (2) a pretreatment layer of Na X-zeolite followed by a main or air separation adsorbent layer of Na X-zeolite and a second main or air separation adsorbent layer of Ca X-zeolite (2(A)#70° F., 2(B)#90° F.). Recovery and production are up using the multiple layered main or air separation adsorbent of the present invention and specific power is reduced as set forth in Table 5.

TABLE 5

PERFORMANCE COMPARISON-VSA CYCLE

| Case | 1(A) | 2(A) | 1(B) | 2(B) |
|---|---|---|---|---|
| NaX Pretreat Volume, % of total | 17% | 17% | 17% | 17% |
| NaX Main Sieve Volume, % of total | 0.0 | 25% | 0.0 | 25% |
| CaX Main Sieve Volume, % of total | 83% | 58% | 83% | 58% |
| Bed Diameter, ft. | 12 | 12 | 12 | 12 |
| Product Purity, % $O_2$ | 90 | 90 | 90 | 90 |
| Cycle Time, sec. | 135 | 135 | 135 | 135 |
| Feed Pressure, psig | 7 | 7 | 7 | 7 |
| Feed Temperature, °F. | 90 | 90 | 70 | 70 |
| $O_2$ Production, TPD$_c$ | 45.9 | 46.4 | 47.2 | 48.9 |
| $O_2$ Recovery, % | 55.6 | 56.4 | 55.0 | 56.5 |
| Specific Power KW/TPD | 12.0 | 11.9 | 11.7 | 11.24 |

EXAMPLE 3

An oxygen VSA pilot plant was operated using the cycle of Table 2 at an inlet feed temperature of 90° F. using a bed containing a pretreatment layer of Na X-zeolite and an air separation layer of Ca X-zeolite wherein the cycle was varied by the inclusion or exclusion of a Na X-zeolite air separation layer between the pretreatment layer and the Ca X-zeolite. This constitutes a second comparison to Schmidt, et al., U.S. Pat. No. 4,892,565 (without a Na X-zeolite air separation layer) and the Present Invention (with a Na X-zeolite air separation layer). The data is set forth in Table 6. The comparison demonstrates a 13% improvement in oxygen production, a 10% improvement in oxygen recovery and a 10% reduction in specific power at 90° F. using the present invention, in comparison to the process comparable to Schmidt, et al.

TABLE 6

ACTUAL PERFORMANCE COMPARISON-VSA CYCLE

| Case | Schmidt | Invention |
|---|---|---|
| NaX Pretreat Volume, % of total | 17% | 17% |
| NaX Main Sieve Volume, % of total | 0.0 | 30% |
| CaX Main Sieve Volume, % of total | 83% | 53% |
| Bed Diameter, ft. | 3 | 3 |
| Product Purity, % $O_2$ | 90 | 90 |
| Cycle Time, sec. | 88 | 88 |
| Feed Pressure, psig | 20.4 | 20.4 |
| Feed Temperature, °F. | 90 | 90 |
| $O_2$ Production, TPD$_c$ | 1.0 | 1.13 |
| $O_2$ Recovery, % $O_2$ Minimum | 1.0 | 1.10 |
| Specific Power KW/TPD | 1.0 | 0.91 |

The present invention has been set forth with regard to several preferred embodiments. However the full scope of the present invention should be ascertained from the claims which follow.

We claim:

1. A process for separating oxygen-rich gas from air by adsorption of nitrogen in said air, comprising:

a. passing said air into a multilayered adsorption bed having an inlet for admitting said air and an outlet for removing said owygen-rich gas, a pretreatment adsorbent layer adjacent said inlet used to remove impurities in said air including water and carbon dioxide, followed by multiple layers of air separation adsorbent in said bed comprising a layer of Na X-zeolite near said inlet comprising between approximately 20% and 70% by volume of the total adsorbent of said adsorption bed and at least another layer of air separation adsorbent near said outlet selected from the group consisting of Ca X-zeolite, Li X-zeolite, CKka A-zeolite ffollowed by Ca X-zeolite, Ca A-zeolite followed by Li X-zeolite, and Ca X-zeolite followed by Li X-zeolite followed by Ca X-zeolite and Mg A-zeolite followed by Ca X-zeolite;

b. adsorbing at least said nitrogenon said multiple layers; and recovering said oxygen-rich gas as a relatively unadsorbed product from said outlet of said bed.

2. The process of claim 1 wherein said bed is one of a set of parallel beds and is operated cyclically through a series of steps in a PSA process comprising:

a. passing said air into said inlet os said bed to adsorb at least said nitrogen and to recover said oxygen-rich gas as said unadsorbed product at said outlet;

b. terminating passage of said air into said bed and depressurizing said bed to provide pressurizing gas to a parallel bed;

c. depressurizing said bed to vent, countercurrently to the passage of said air;

d. purging said depressurizing bed with said oxygen-rich gas;

e. repressurizing said purging bed with pressurizing gas from another parallel bed undergoing depressurization; and f. further repressurizing said repressurizing bed with said air.

3. The process of claim 2 wherein two beds are connected in parallel.

4. The process of claim 1 wherein said bed is one of a set of parallel beds and is operated cyclically through a series of steps in a VSA process comprising:

a. passing said air into said inlet of said bed to adsorb at least said nitrogen and to recover said oxygen-rich gas as said unadsorbed product at said outlet;

b. terminating passage of said air into said bed and depressurizing the bed to provide purge gas to a parallel bed;

c. further depressurizing said bed to provide pressurizing gas to a parallel bed;

d. evacuating said depressurizing bed countercurrently to the passage of said air to a subatmospheric pressure level;

e. purging said evacuating bed with said purge gas from a parallel bed;

f. repressurizing said purging bed with said pressurizing gas from a parallel bed; and g. further repressurizing said purging bed with said oxygen-rich gas.

5. The process of claim 4 wherein at the initial portion of step (b) said bed is cocurrently depressurized to recover additional of said oxygen-rich gas beforeproviding said purge gas.

6. The process of claim 5 wherein said repressurizing of step (g) is performed with said oxygen-rich gas and said air.

7. The process of claim 4 wherein three beds are connected in parallel.

8. The process of claim 1 wherein said bed is operated cyclically through a series of steps in a VSA process comprising:

a. passing said air into said inlet of said bed to adsorb at least said nitrogen and to recover said oxygen-rich gas as said unadsorbed product at said outlet;

b. terminating passage of said air into said bed and depressurizing said bed to provide pressurizing gas to a parallel bed;

c. evacuating said depressurizing bed countercurrently to the passage of said air to a subatmospheric pressure level;

d. purging said evacuating bed with said oxygen-rich gas from a parallel bed;

e. repressurizing said pruging bed with said air and said pressurizing gas from a parallel bed; and f. further repressurizing said purging bed with said air.

9. The process of claim 8 wherein two beds are connected in parallel.

10. An apparatus for separating oxygen from air by adsorption of nitrogen in said air, comprising:

a multilayered adsorption bed having an inlet for admitting said air and an outlet for removing an oxygen-rich gas, a pretreatment adsorbent layer adjacent said inlet used to remove impurities in said air including water and carbon dioxide, followed by multiple layers of air separation adsorbent in said bed comprising a layer of Na X-zeolite air separation adsorbent near said inlet comprising between approximately 20% and 70% by volume of the total adsorbent of said adsorption bed and at least another layer of air separation adsorbent near said outlet selected from the group consisting Ca X-zeolite, Li X-zeolite, Ca A-zeolite followed by Ca X-zeolite, Ca A-zeolite followed by li X-zeolite, Ca X-zeolite followed by Li X-zeolite, Li X-zeolite followed by Ca X-zeolite and Mg A-zeolite followed by Ca X-zeolite.

11. The apparatus oc claim 10 wherein said multilayered adsorption bed is employed in a PSA process to recover said oxygen-rich gas as an unadsorbed product with said layer of Na X-zeolite air separation adsorbent comprising between 50 and 70% by volume of said total adsorbent of said multilayered adsorption bed, with said another layer of air separation adsorbent near said outlet being Ca X-zeolite.

12. The apparatus of claim 10 wherein said multilayerd adsorption bed is employed in a VSA process t6o recover said oxygen-rich gas as an unadsorbed product with said layer of Na X-zeolite air separation adsorbent comprising between 20 and 50% by volume of said total adsorbent of said multilayered adsorption bed, with said another layer of air separation adsorbent near said outlet being Ca X-zeolite.

13. The apparatus of claim 10 in which said pretreatment adsorbent layer comprises up to 17% by volume of said total adsorbent.

14. The apparatus of claim 10 wherein said Li X-zeolite is Li,Zn LSX zeolite.

15. The apparatus of claim 10 wherein said Mg A-zeolite is Mg,Li A-zeolite.

* * * * *

UNITED STATES PATENT AND TRADEMARK OFFICE
CERTIFICATE OF CORRECTION

PATENT NO. : 5,529,610
DATED : Jun. 25, 1996
INVENTOR(S) : Watson, et al.

It is certified that error appears in the above-indentified patent and that said Letters Patent is hereby corrected as shown below:

Column 1, line 10, delete "-" between "directed" and "to" and insert a space in its place.

Column 10, line 6, delete "owygen-rich" and insert -- oxygen-rich --.

Column 10, line 15, delete "CKka A-zeolite ffollowed" and insert -- Ca A-zeolite followed --.

Column 10, line 17, between "zeolite" and "followed", insert -- Li X-zeolite -

Column 10, line 20, delete "nitrogenon" and insert -- nitrogen on --.

Column 10, line 22, at the beginning of the line, insert -- c. --.

Column 10, line 27, delete "os" and insert -- of --.

Column 11, line 1, delete "beforeproviding" and insert -- before providing --.

Column 11, line 22, delete "pruging" and insert -- purging --.

Column 12, line 7, delete "li" and insert -- Li --.

Column 12, line 11, delete "oc" and insert -- of --.

Column 12, line 19, delete "t6o" and insert -- to --.

Column 12, line 30, insert a space between "Li," and "Zn".

UNITED STATES PATENT AND TRADEMARK OFFICE
CERTIFICATE OF CORRECTION

PATENT NO. : 5,529,610
DATED : June 25, 1996
INVENTOR(S) : Watson, et al.

It is certified that error appears in the above-indentified patent and that said Letters Patent is hereby corrected as shown below:

Column 12, line 32, insert a space between "Mg," and "Li".

Signed and Sealed this

Twenty-fourth Day of September, 1996

Attest:

BRUCE LEHMAN

*Attesting Officer*    *Commissioner of Patents and Trademarks*